United States Patent

Levivier et al.

[11] Patent Number: 6,076,864
[45] Date of Patent: Jun. 20, 2000

[54] FLANGE FOR COMPENSATOR COUPLINGS OR PIPES

[76] Inventors: Guy Levivier, 96 Route Nationale, 59300 Aulnoy les Valenciennes; Yves Levivier, 6, rue David Desvachez, 59300 Valenciennes, both of France

[21] Appl. No.: 08/581,769

[22] Filed: Jan. 2, 1996

[30] Foreign Application Priority Data

Jan. 25, 1995 [FR] France .................................. 95 00839
Nov. 21, 1995 [FR] France .................................. 95 13793

[51] Int. Cl.[7] .................................................. F16L 23/00
[52] U.S. Cl. ........................ 285/405; 285/226; 285/363
[58] Field of Search .................................. 285/228, 229, 285/363, 368, 405, 412, 226

[56] References Cited

U.S. PATENT DOCUMENTS

| 992,022 | 5/1911 | Matthews | 285/363 X |
|---|---|---|---|
| 1,233,170 | 7/1917 | Berry | 285/363 X |
| 2,434,224 | 1/1948 | Paul . | |
| 2,528,343 | 10/1950 | Davis . | |
| 4,026,585 | 5/1977 | Berghofer | 285/229 |
| 4,372,587 | 2/1983 | Roche | 285/238 |
| 4,394,562 | 7/1983 | Epstein et al. | 285/405 X |
| 5,362,115 | 11/1994 | Carr | 285/363 |
| 5,413,389 | 5/1995 | Schlicht | 285/412 X |
| 5,437,482 | 8/1995 | Curtis | 285/174 |

FOREIGN PATENT DOCUMENTS

1360847  8/1964  France .

*Primary Examiner*—Heather Shackelford
*Attorney, Agent, or Firm*—Baker & Daniels

[57] ABSTRACT

A light weight flange for compensator couplings which includes a generally circular ring-like structure having first and second rings. A plurality of arms interconnect the first and second rings. The arms are separated by a first plurality of apertures. The arms are provided with a second plurality of apertures for accommodating assembly bolts.

1 Claim, 7 Drawing Sheets

FIG_1

FIG_2

FIG_3

FIG_4A

FIG_5A

FIG_4B

FIG_5B

FIG. 6

FIG_7

FIG_8

FIG_9

FIG_11

FIG_13

FIG_10

FIG_12

FIG_14

FLANGE FOR COMPENSATOR COUPLINGS OR PIPES

This is a continued prosecution of application Ser. No. 08/581,769 filed Jan. 2, 1996.

BACKGROUND OF THE INVENTION

The invention relates to a flange for compensator couplings or pipes, consisting of a circular ring provided with apertures for the assembly bolts.

Flanges are essential components for assembly of pipes in industrial piping. This assembly consists of connecting the flanges in pairs to the ends of the pipes, and compressing a gasket between the flanges. This assembly is obtained by means of bolts which pass through the apertures of the flanges.

The term "flange(s)" as used above and throughout the description includes both the actual flanges, and the mating flanges, a term which sometimes designates lapped flanges.

Figure 1:
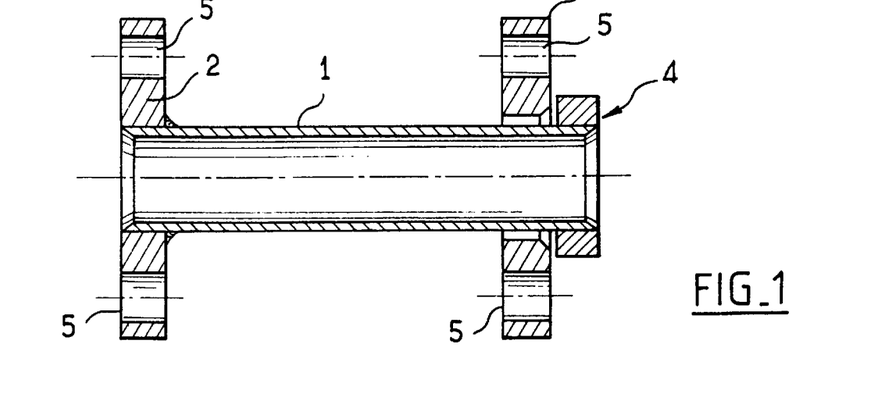
FIG. 1 is an axial cross-section of a pipe provided with a flange and a mating flange with a flat collar.
Figure 2:
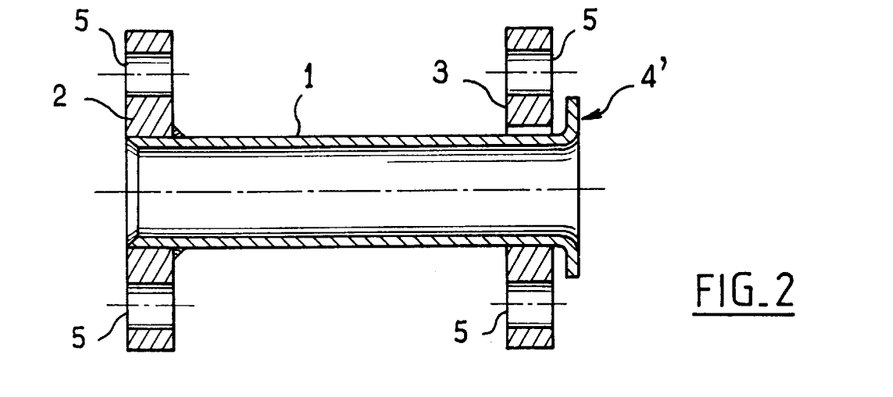
Figure 2 is an axial cross-section of a pipe provided with a flange and a mating flange with a turned-up collar.

More specifically, according to FIGS. 1 and 2, the pipes 1 are in general provided at one end with a welded flange 2, and the other end can also contain a welded flange or a free flange 3 disposed behind a flat collar 4 welded to the end of the pipe.

According to a variant, the flange 3 is disposed behind a turned-up collar 4', provided directly at the end of the pipe 1 or welded to the latter.

The flanges 2, 3 are provided with apertures 5 for passage of bolts, not shown.

Figure 3:
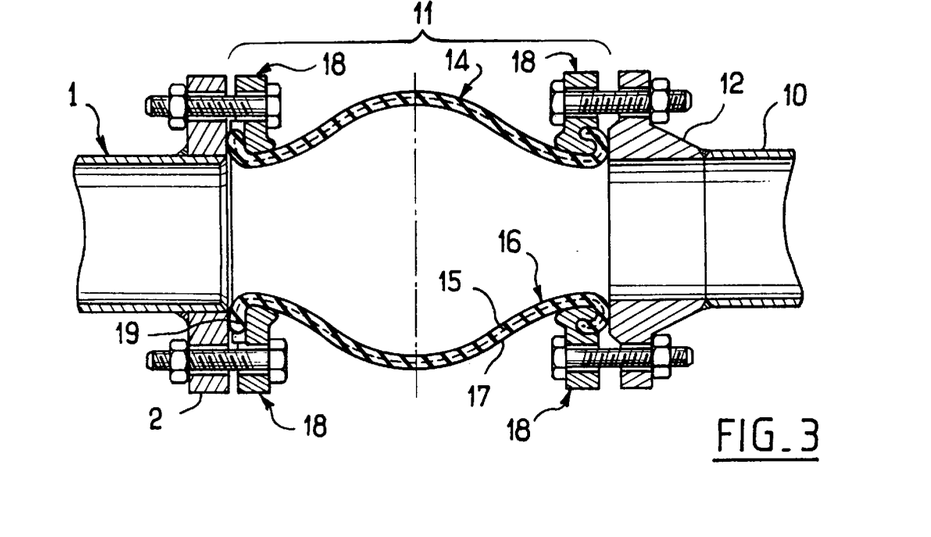
FIG. 3 is an schematic axial cross-section of the assembly of two pipes with a compensator coupling interposed.

There are also cases where two pipes 1, 10, which are provided at their corresponding ends with a flange 2, 12, are assembled by means of a compensator coupling 11 (FIG. 3). The actual coupling 11 consists of a multi-layer metal carcass with reinforcement of the flat sealing bead 15, provided with an inner lining 16 and an outer lining 17, the linings being made of rubber or a plastics material which is resistant to the fluid which flows in the pipes. At the ends, there are two mating flanges 18, which are factory-mounted on the coupling 11.

The coupling 11 is attached to the flanges 12, 13 of the pipes by means of mating flanges 18, and at the same time the edges 19 of the coupling 11 constitute the gasket. Assembly is by means of the bolts 32.

These compensator couplings permit absorbtion of faults of alignment (parallax or inclination) or expansion of the pipes 1, 10, or hammer blows They prevent or reduce transmission of vibrations.

The flanges or mating flanges, in particular those of compensator couplings, are currently made by machining of flame-cut parts, by forging, or from grey cast iron. However this last solution is only suitable for flanges which are not destined to be welded, since cast iron is involved. These cast iron flanges also have the disadvantage that they are heavy and fragile.

The actual flanges are welded to the pipes, whereas the mating flanges are fitted on the end of the pipes. The flanges of the compensator couplings are factory-mounted on the resilient couplings, and are supplied assembled to the user.

The weight of the flanges is an important factor, since the price of a flange depends directly on its weight, as all the operations carried out on the flanges (surface treatment, transport, etc.) are invoiced by weight.

The dimensional tolerances and accuracy of the flanges currently manufactured is often unsatisfactory, since for reasons of labour cost, the flanges are mainly manufactured in countries with a low labour cost, on poorly developed machines; the dimensions of all the parts have to be checked, and if necessary, adjustments must be made by machining.

This work is lengthy and costly. There are also the problems of long supply lead times, and high stock control cost.

In greater detail, there are a given number of prior art documents which describe flanges.

For example document U.S. Pat. No. 2,528,343 describes a flanges which is provided with trapezoidal openings distributed in a fan-shape, in order to permit absorbtion of slight faults of correspondence of the openings of the other flange.

Another document U.S. Pat. No. 4,372,587 describes a flange composed of two halves which have ends on both sides in lugs. The two halves are connected by bolts which pass through the two arms, in order to clamp and fasten this flange by means of teeth onto the pipe. After this assembly, the flange is connected to the flange of the other pipe.

This flange which is composed of two parts relates to a very specific requirement, i.e. that of fastening a flange to the end of a pipe by means of a relatively large fastening surface thickness of the flange must be increased locally as compared to a conventional flange.

To summarise, there are different shapes of flanges, but in no case does the prior art refer to transmission and distribution of forces in a flange, associated with weight reduction of the latter.

SUMMARY OF THE INVENTION

The object of the present invention is to provide flanges and mating flanges, the weight of which is reduced as compared to prior art flanges and mating flanges, so as to be able to use more efficient manufacturing techniques without an increase in cost and possibly with a decrease in cost and to thereby improve the operations of transport, storage, packaging and use.

For this purpose, the invention relates to a flange of the above-described type, characterised in that it comprises:
   an inner ring;
   an outer ring which is connected to the inner ring by arms which are provided with apertures for the passage of the assembly bolts.

The new structure of the flange and mating flange according to the invention permits excellent distribution of the clamping forces between the inner ring and the outer ring, with a substantial saving of material, and consequently a considerable reduction of weight. This reduction, which is 50–65%, makes it possible to utilize production techniques which are currently prohibitive owing to the cost (associated with the weight).

According to a particularly advantageous feature, the flange according to the invention is made in particular by casting in SG (spheroidal graphite) cast iron, cast steel, or cast aluminium. This manufacturing technique is compatible from the point of view of cost with conventional manufacture, precisely owing to the reduction of weight of the flange. However this casting technique provides the advantage of excellent accuracy of manufacture, which permits elimination of lengthy and costly checking operations.

This manufacturing technique also reduces the proportion of the cost of labour in the price of the product as a whole, which permits manufacture of flanges of these types in countries with a high labour cost, whilst obtaining a competitive product. This makes it possible to eliminate from manufacture a given number of very serious disadvantages such as stock control, by reducing stock by almost half, and by preventing problems of more or less random supply concerning delivery periods, and prices of products obtained from countries with a low labour cost.

The reduction of the weight of the flanges permits substantial savings in the operations of protection (galvanisation, chromating etc.), as well as in those of packaging and transport. The considerable reduction of weight allows a larger number of parts to be packed on a single pallet; this reduces considerably the cost of the packaging (pallet, plastic cover) in the price of each part.

Finally, the reduction of the weight permits a considerable saving in use in all industries, for example in the Navy, by reducing the dead weight of equipment transport or loads withstood by the infrastructures (refineries, chemical installations etc.).

According to other advantageous features:

the arms have reduced thickness relative to at least one of the rings;

the apertures are oblong;

the arms have a contour in the form of an arc of a circle centred on the apertures;

the arms have a straight contour which faces radially the centre of the flange;

the inner ring has on one surface a collar which forms a double recess which delimits a groove;

the inner ring contains a groove;

the flange contains reinforcements which connect the inner ring to the outer ring in the interval of the arms provided with apertures for passage of the bolts;

the flange consists of SG cast iron, cast aluminium, or cast steel (carbon steel, stainless steel) and;

the inner ring is extended by a deformation in the form of a cap, in order to constitute a blind flange.

BRIEF DESCRIPTION OF THE DRAWINGS

The present invention is described hereafter in greater detail by means of the attached drawings in which.

DESCRIPTION OF THE PREFERRED EMBODIMENT

Figure 4A:
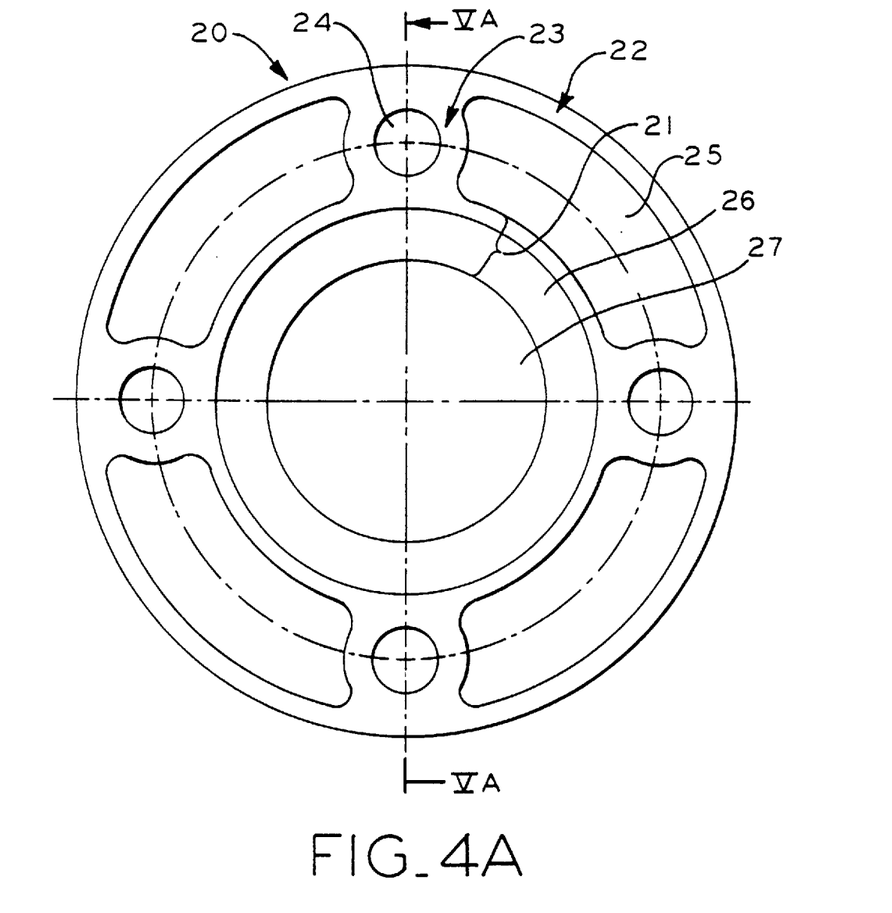
FIG. 4A is a front view of a mating flange for a resilient coupling with a single recess.
Figure 4B:
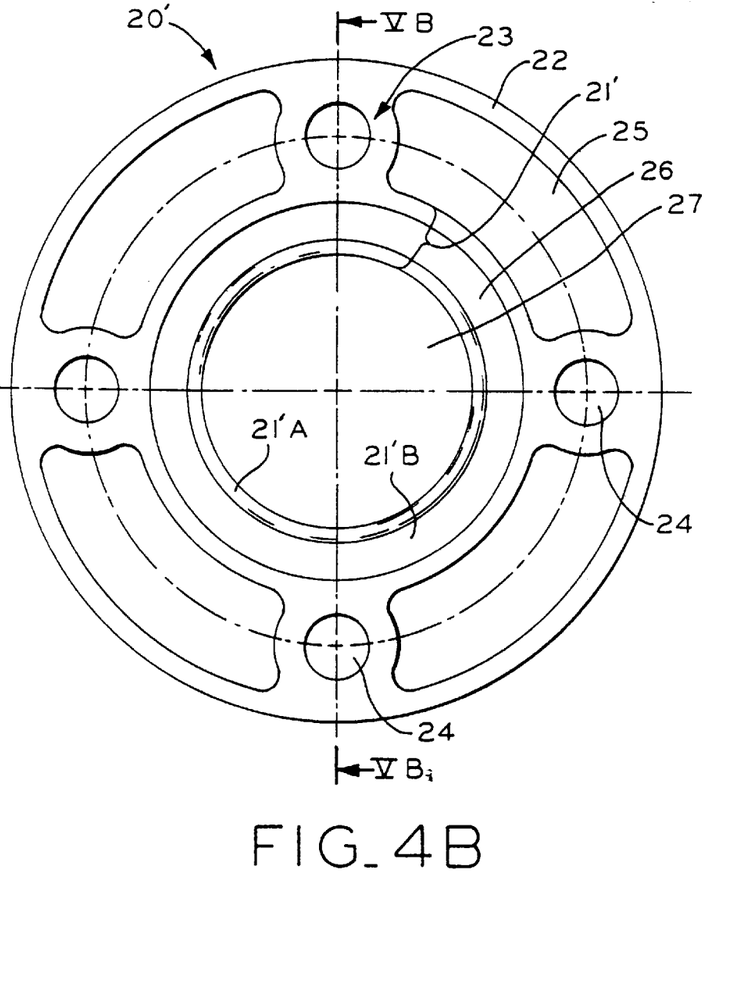
Figure 4B is a front view of a mating flange for a resilient coupling with a double coupling-type recess.
Figure 5A:
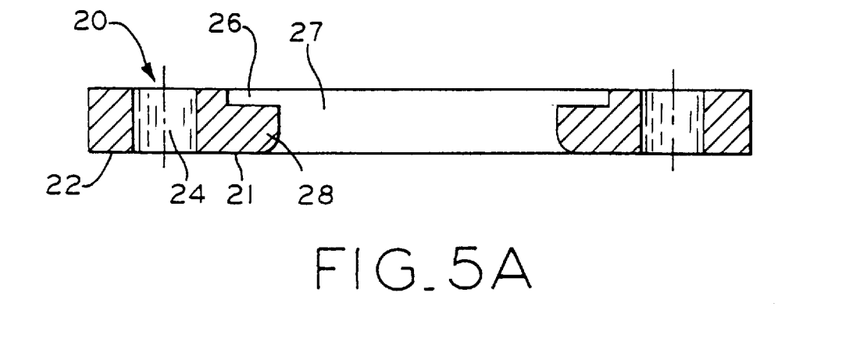
FIG. 5A is a cross-section taken along line VA—VA of the flange of FIG. 4A.
Figure 5B:
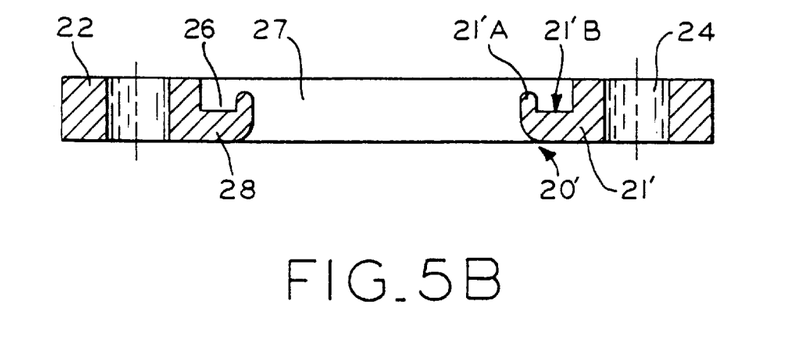
Figure 5B is a cross-section taken along line VB—VB of the flange of FIG. 4B.

FIG. 4 shows on its upper part half a flange 20 consisting of an inner ring 21 connected to an outer ring 22 by arms 23, which themselves are provided with apertures 24 for the assembly bolts.

In this example, there are four arms 23 distributed equiangularly. The number of bolt apertures is standardised according to the application of the flange (pipe diameter, operating pressure etc).

The interval 25 between the inner ring 21, the outer ring 22 and the arms corresponds to openings.

According to the embodiment in FIG. 4A, the shape of the arms 23 is in the form of an arc of a circle centred on each aperture 24. The inner ring 21 has a female recess 26, which opens onto the front surface of the flange and its passage 27.

On the other side, the passage 27 is edged by a shoulder 28.

The lower part of FIG. 4B shows a flange variant 20' of which only the inner ring 21' is modified compared with inner ring 21 of the flange 20. This inner ring 21' forms a double female recess in the front surface of the flange by means of its collar 21'A which defines a groove 21'B.

The parts of this flange 20' which are identical to those of the flange 20 have the same reference numerals, and their description is therefor not repeated.

The shape of the recesses of the flanges 20, 20' corresponds to that of the flanges in FIG. 3.

Figure 6:
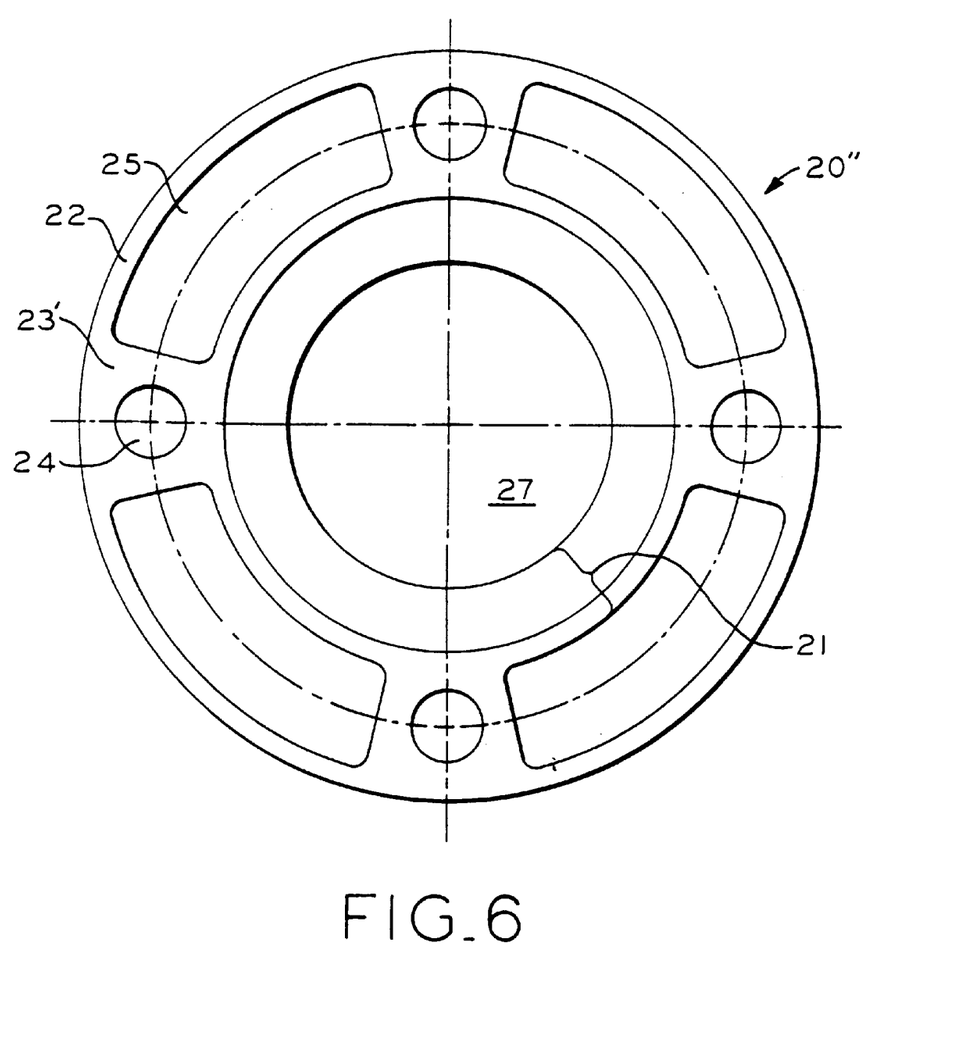
FIG. 6 is a half front view of a flange variant.

FIG. 6 shows a variant 20" of the flange 20 in FIGS. 4A and 4B. It is distinguished in the shape of the arms 23', which are delimited by contours which define radial lines centered on the center of the flange. The other parts of this flange 20", which are identical to those of FIG. 4, have the same reference numerals and their description is not repeated.

Figure 7:
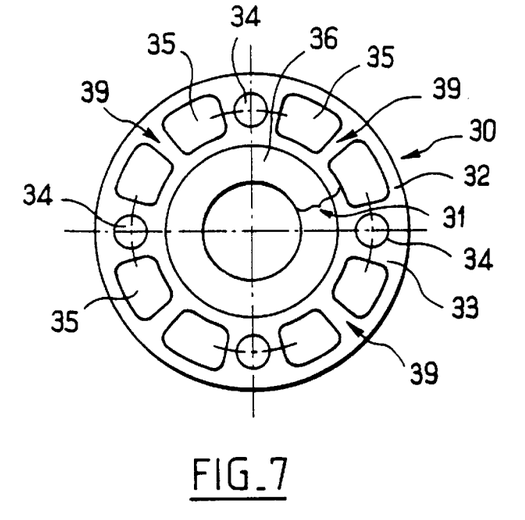
FIG. 7 is a front view of a mating flange for a coupling, reinforced with a single female recess.

FIG. 7 shows a variant flange 30 consisting of an inner ring 31, an outer ring 32 connected by arms 33 with apertures 34 therein for the assembly bolts, and by reinforcement arms 39 which form openings 35 with the arms 33 and rings 31, 32.

Similarity to flanges 20, 20', and 20", this flange 30 has for example a single female recess 36 for accommodating a coupling.

Figure 8:
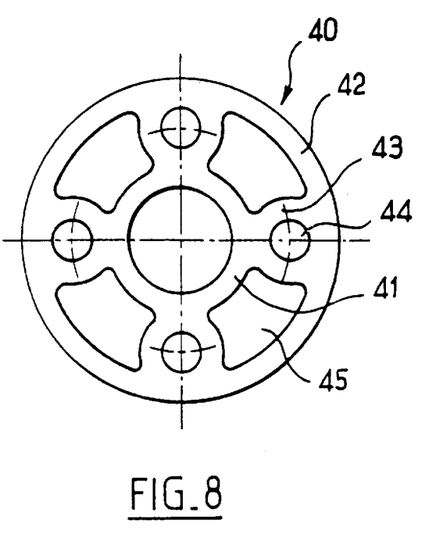
FIG. 8 is a front view of a flange to be welded.

The flange 40 in FIG. 8 is similar to that in FIGS. 4A and 4B in the shape of the outer ring 42 and the arms 43 which are provided with apertures 44 and form openings 45. The inner ring 41 differs in that it does not contain a recess, this flange being designed to form a flange to be welded or a mating flange for a pipe such as those in FIGS. 1 and 2.

Figure 9:
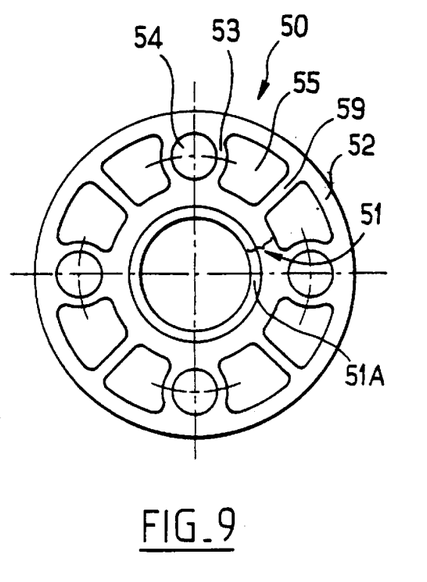
FIG. 9 is a front view of a flange to be welded with reinforcements.

The flange 50 in FIG. 9 is a lapped flange or mating flange such as the flange shown in FIGS. 1 and 2. It has reinforcements 59 between the inner ring 51 and the outer ring 52, in addition to the arms 53 provided with apertures 54.

In this case the inner ring 51 contains a shoulder 51A.

Figure 10:
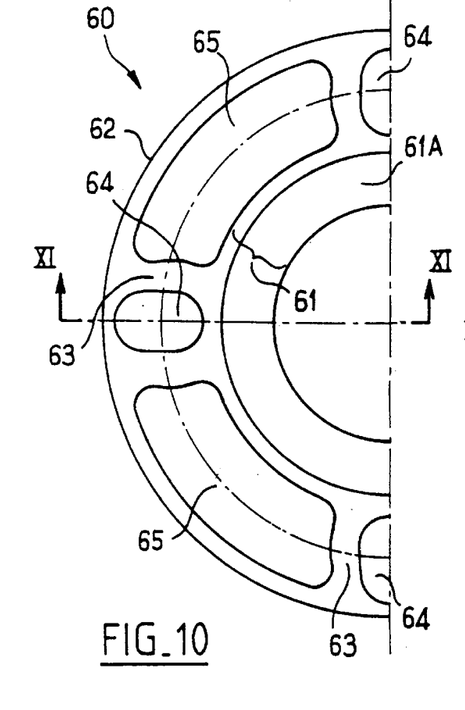
FIG. 10 is a front view of half a flange with a single female recess.
Figures 11, 13:
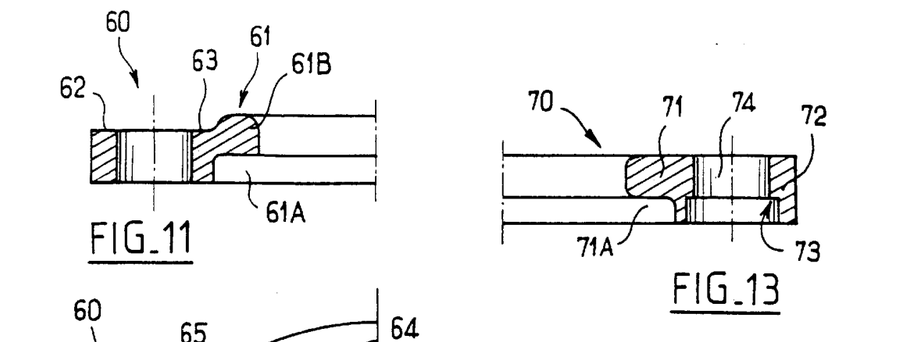
FIG. 11 is a cross-section according to XI—XI in FIG. 10.
FIG. 13 is a cross-section according to XIII—XIII in FIG. 12.

The flange 60 in FIGS. 10, 11 is characterised by reduced thickness of the outer ring 62 and the arms 63 relative to the inner ring 61, which is extended on one surface by a collar 61B, and on the other contains a recess 61A. In this example the apertures are oblong and are designated 64, and the openings between the ring 61, 62 and the arms 63 are designated 65.

The oblong shape of the apertures permits an even greater reduction of the weight of the flange, representing a saving in weight of approximately 10%.

Figure 12:
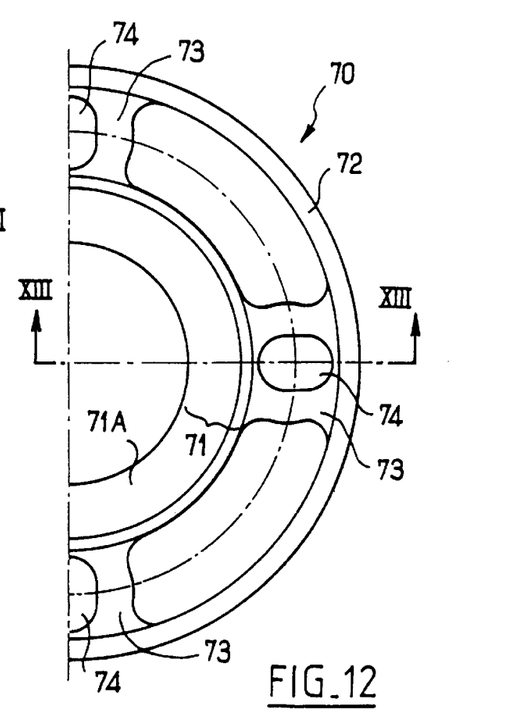
FIG. 12 is a front view of half a flange with a single female recess according to another embodiment.

The flange 70 in FIGS. 12, 13 also has a single female recess 71A.

This flange 70 is distinguished from the previous flanges by reduction of thickness of the arms 73 which connect the inner collar 71 to the outer collar 72. The arms 73 contain oblong apertures 74, and the inner collar 71 has a recess 71A.

Figure 14:
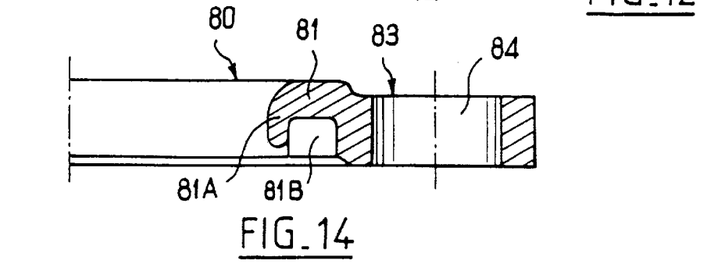
FIG. 14 is a cross-section similar to that in FIG. 13 on an enlarged scale, showing a variant embodiment of FIGS. 12 and 13.

The variant flange 80 consisting of the final cross-section in FIG. 14 substantially corresponds to the form of the flange represented in FIGS. 12, 13; a double female recess countershaft is provided with oblong apertures 84 in its reduced thickness arias 83. On one of the surfaces, a collar 81A delimits a peripheral groove 81B in the inner ring 81, in order to form the double female recess.

Figure 15:
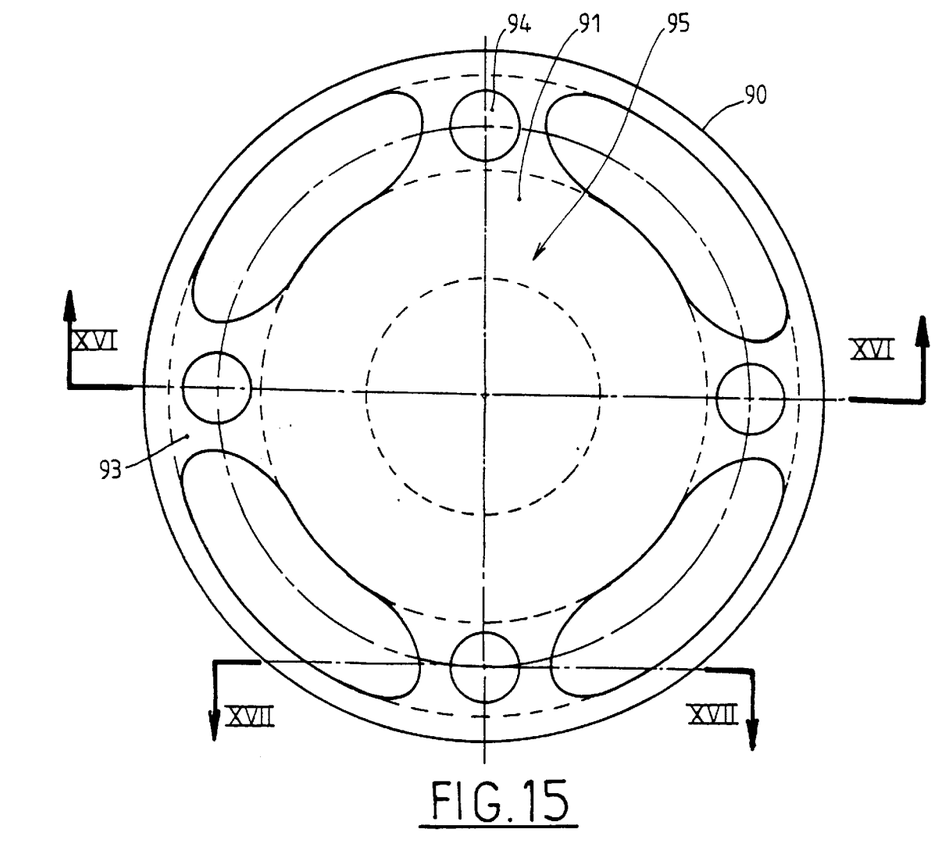
FIG. 15 is a front view of a blind flange according to the invention.
Figure 16:
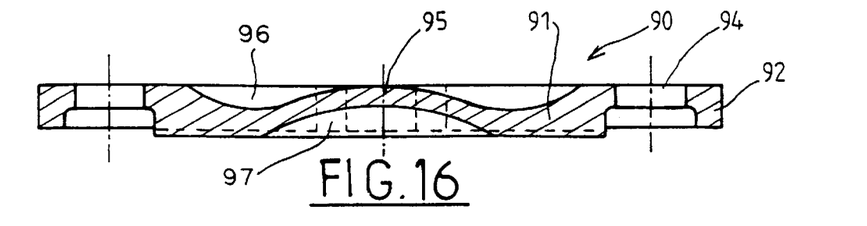
FIG. 16 is a cross-section according to XVI—XVI in FIG. 15.
Figure 17:
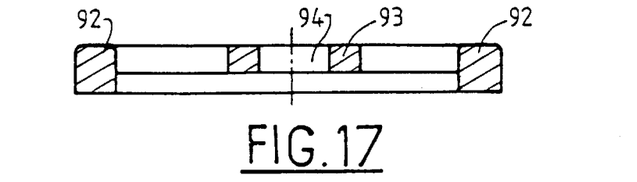
FIG. 17 is a cross-section according to XVII—XVII in FIG. 15.

FIGS. 15, 16, 17 show a variant flange 90 according to the invention, in the form of a blind flange, for example in order to close a duct.

This flange 90 has an Inner collar 91, an outer collar 92 and arms 93 which are provided with apertures 94.

The inner flange 91 is extended by a deformation 95 in particular in the form at a cap which closes the centre of the flange 90. The deformation leaves substantial cavities 96, 97 on both sides of the flange.

FIGS. 15, 16 show the reduced thickness of the arms 93 between the outer ring 92 and the inner ring 91.

The cross-section in FIG. 17 also emphasises the shape of an arm 93, its thickness, and that of the outer ring 92.

The flanges, mating flanges and blind flanges according to the invention are advantageously manufactured from cast steel, SG (spheroidal graphite) cast iron, or cast aluminium, or by forging and cutting.

AS an example, a current mating flange of typo PN16 DN65 (nominal pressure 16 bars, nominal diameter 65 mm) for a resilient or compensator coupling, weighs 2.6 kg (machined) and 2 kg (forged) whereas a mating flange of the same type according to the invention made of SG cast iron weighs only 0.90 kg, and 0.34 kg when made of cast aluminium.

Additionally, manufacture from SG cast iron permits outputs of 200 to 250 parts per hour on a specific type of installation, compared with 30 to 50 by machining.

As already stated, in addition to the substantial saving in weight and increase in output, this manufactured parts have excellent precision; this eliminates part-by-part checks and re-machining time. Since the parts are lighter, the price of packaging and transport is reduced correspondingly. The very substantial reduction of the manufacturing cost permits on-the-spot manufacture, with which imports from low wage countries cannot compete, thus eliminating problems of management, stock, delivery periods, re-supply and random prices. The flanges and mating flanges according to the invention can be manufactured in all dimensions and applications, as free flanges, flanges to be welded and mating flanges.

We claims:

1. A flange for securing compensator couplings to pipes by means of assembly bolts, said flange comprising: a generally circular structure including first and second rings, a plurality of arms interconnecting said first and second rings, said arms separated by first apertures, said arms provided with second apertures for accommodating assembly bolts, said arms having a contour in the shape of an arc of a circle centered on the second apertures.

* * * * *